United States Patent
Matsumoto et al.

(10) Patent No.: US 10,873,076 B2
(45) Date of Patent: Dec. 22, 2020

(54) NEGATIVE ELECTRODE ACTIVE MATERIAL FOR NONAQUEOUS ELECTROLYTE SECONDARY BATTERY

(71) Applicant: Panasonic Intellectual Property Management Co., Ltd., Osaka (JP)

(72) Inventors: Hiroyuki Matsumoto, Tokyo (JP); Hiroshi Kawada, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 16/142,648

(22) Filed: Sep. 26, 2018

(65) Prior Publication Data

US 2019/0027742 A1    Jan. 24, 2019

Related U.S. Application Data

(63) Continuation of application No. PCT/JP2017/009415, filed on Mar. 9, 2017.

(30) Foreign Application Priority Data

Mar. 31, 2016 (JP) .................................. 2016-070270

(51) Int. Cl.
*H01M 4/36* (2006.01)
*H01M 4/587* (2010.01)
(Continued)

(52) U.S. Cl.
CPC .......... *H01M 4/366* (2013.01); *H01M 4/587* (2013.01); *H01M 10/0562* (2013.01);
(Continued)

(58) Field of Classification Search
CPC ... H01M 4/366; H01M 4/587; H01M 10/0562
See application file for complete search history.

(56) References Cited

U.S. PATENT DOCUMENTS

2004/0121073 A1* 6/2004 George .................... B01J 2/006
                                                                   427/215
2011/0099798 A1* 5/2011 Nilsen ..................... C23C 16/40
                                                                   29/623.5

(Continued)

FOREIGN PATENT DOCUMENTS

JP    2000-67865 A     3/2000
JP    2002-373643 A   12/2002
(Continued)

OTHER PUBLICATIONS

International Search Report dated Jun. 6, 2017, issued in counterpart International Application No. PCT/JP2017/009415 (2 pages).

*Primary Examiner* — Helen Oi K Conley
(74) *Attorney, Agent, or Firm* — Westerman, Hattori, Daniels & Adrian, LLP (57) ABSTRACT

A negative electrode active material for a nonaqueous electrolyte secondary battery includes secondary particles each formed of primary particles bonded to each other, and the primary particles contain carbon material particles and a lithium ion-conductive solid electrolyte which covers the surfaces of the carbon material particles.

10 Claims, 4 Drawing Sheets

(51) Int. Cl.
*H01M 10/0562* (2010.01)
*H01M 4/02* (2006.01)

(52) U.S. Cl.
CPC .. *H01M 2004/027* (2013.01); *H01M 2220/30* (2013.01); *H01M 2300/0071* (2013.01)

(56) References Cited

U.S. PATENT DOCUMENTS

| | | | | |
|---|---|---|---|---|
| 2011/0311882 | A1* | 12/2011 | Kim | H01M 4/505 |
| | | | | 429/320 |
| 2014/0170503 | A1* | 6/2014 | Yushin | H01M 10/0525 |
| | | | | 429/306 |
| 2014/0205905 | A1* | 7/2014 | Xiao | H01M 4/049 |
| | | | | 429/223 |
| 2014/0255798 | A1* | 9/2014 | Amine | H01M 12/08 |
| | | | | 429/405 |
| 2016/0351973 | A1* | 12/2016 | Albano | H01M 4/366 |

FOREIGN PATENT DOCUMENTS

| | | |
|---|---|---|
| JP | 2003-59492 A | 2/2003 |
| JP | 2008-27581 A | 2/2008 |
| JP | 2013-8526 A | 1/2013 |
| JP | 2014-241282 A | 12/2014 |

\* cited by examiner

NEGATIVE ELECTRODE ACTIVE MATERIAL FOR NONAQUEOUS ELECTROLYTE SECONDARY BATTERY

TECHNICAL FIELD

The present invention relates to an improvement of a negative electrode active material containing carbon material particles to be used for a nonaqueous electrolyte secondary battery.

BACKGROUND ART

As a negative electrode active material for a nonaqueous electrolyte secondary battery, such as a lithium ion battery, various carbon materials are used. In particular, graphite is mainly used, and for example, natural graphite, artificial graphite, and graphitized mesophase carbon particles are used.

On the surface of a carbon material, a nonaqueous electrolyte containing a nonaqueous solvent and a lithium salt partially irreversibly reacts in association with charge/discharge. During this reaction, solid electrolyte interfaces (SEIs) are produced so as to cover surfaces of carbon material particles. In general, when a nonaqueous electrolyte secondary battery is charged immediately after being assembled, a largest amount of SEIs is produced. Since lithium ions are incorporated in SEIs, as the production amount of SEIs is increased, an irreversible capacity is increased, and as a result, a battery capacity is decreased.

Accordingly, in order to suppress the production of SEIs, a technique in that the surface of a negative electrode material containing carbon as a primary component is covered with a lithium compound represented by $Li_xSi_yO_z$ (100y/(x+y)=10 to 80) has been proposed (Patent Document 1).

CITATION LIST

Patent Document

Patent Document 1: Japanese Published Unexamined Patent Application No. 2000-67865

SUMMARY OF INVENTION

According to Patent Document 1, in particular, after a carbon material, a lithium compound, and a binding agent are mixed together to form a paste, this paste is applied on a negative electrode collector and then dried, so that a negative electrode is formed. By the formation method described above, the adhesion between the lithium compound and the carbon material is low, and hence, the lithium compound is easily peeled away from the carbon material. The peeling as described above is further promoted by the change in volume of the carbon material in association with charge/discharge. In particular, since graphite is expanded by 10% to 20% when occluding lithium ions, the peeling is apparently generated.

In consideration of the above situation, a negative electrode active material for a nonaqueous electrolyte secondary battery according to one aspect of the present disclosure comprises: secondary particles each formed of primary particles bonded to each other, and the primary particles contains carbon material particles and a lithium ion-conductive solid electrolyte which covers the surfaces of the carbon material particles.

According to the negative electrode active material for a nonaqueous electrolyte secondary battery of the present disclosure, since the peeling of the solid electrolyte from the carbon material particles is suppressed, the production amount of SEIs is decreased, and a decrease of the battery capacity is suppressed.

DESCRIPTION OF EMBODIMENTS

A negative electrode active material for a nonaqueous electrolyte secondary battery according to the present invention is formed of secondary particles in each of which primary particles are bonded to each other. In addition, the primary particles are each formed of a lithium ion-conductive carbon material particle and a solid electrolyte which covers the surface of the carbon material particle. That is, the primary particles containing a carbon material are collected and bonded to each other with the solid electrolyte interposed therebetween, so that the secondary particle is formed. In the secondary particle as described above, the bond between the carbon material particle and the solid electrolyte is strong, and the peeling of the solid electrolyte from the carbon material particle is suppressed. In particular, the peeling of the solid electrolyte present between the primary particles bonded to each other is not likely to occur. In addition, the change in volume of the secondary particle in association with charge/discharge is dispersed in the primary particles forming the secondary particle. Hence, even when the volume of the carbon material particle is changed in association with charge/discharge, the peeling of the solid electrolyte from the carbon material particles is not likely to occur.

The carbon material forming the primary particles occludes or releases lithium ions at a potential of 1 V or less with respect to metal lithium. In this potential range, reduction decomposition of a constituent element of a nonaqueous electrolyte is likely to occur on the surface of the carbon material particle, and an SEI is likely to be produced. However, when the surface of the carbon material particle is covered with the solid electrolyte, since the contact between the carbon material particle and the nonaqueous electrolyte is suppressed, the production of the SEI is also suppressed.

The thickness of the solid electrolyte covering the surface of the carbon material particle may be enough so that the contact between the carbon material particle and the non-aqueous electrolyte is suppressed. A uniform layer covering the carbon material particle is preferably formed by a necessary and sufficient amount of the solid electrolyte. For this purpose, the thickness of the solid electrolyte is preferably smaller than the average particle diameter of the carbon material particles and is, for example, preferably 0.1 μm or less and more preferably 0.01 μm (10 nm) or less. However, when the thickness of the solid electrolyte is excessively decreased, for example, electron transfer is advanced by the tunnel effect, and the reduction decomposition of the nonaqueous electrolyte may be advanced in some cases. In view of smooth transfer of lithium ions besides the suppression of the electron transfer, the thickness of the solid electrolyte is preferably 0.5 nm or more.

In this embodiment, the surface of the carbon material particle is not required to be fully covered with the solid electrolyte. In general, many regions of the surface of the carbon material particle are exposed without being covered with the solid electrolyte. In the regions as described above, SEIs are produced. By appropriate production of SEIs, the transfer of lithium ions to and from the carbon material particle is preferably performed.

The lithium ion conductivity of the solid electrolyte may be enough so that lithium ions present in the vicinity of the carbon material particle are transferred to and from the carbon material particle and is not required to have a high lithium ion conductivity. For example, although a material having a lithium ion conductivity of $1.0 \times 10^{-9}$ S/cm or more may be used, the lithium ion conductivity is preferably $1.0 \times 10^{-8}$ S/cm or more. In addition, in order to suppress the reduction decomposition of the nonaqueous electrolyte as much as possible, an electron conduction property of the solid electrolyte is preferably low, and the electron conductivity is preferably less than $1.0 \times 10^{-2}$ S/cm.

As the solid electrolyte, since excellent in lithium ion conductivity, a lithium compound is preferable. As a lithium compound having a lithium ion conductivity, although a sulfide, such as $Li_2S$, a polyanion compound, or the like may be mentioned, in particular, a lithium salt of a polyanion including an element M and an element A is preferable since being more excellent in stability. In the case described above, M is at least one selected from the group consisting of P, Si, B, V, Nb, W, Ti, Zr, Al, Ba, La, and Ta, and A is at least one selected from the group consisting of F, S, O, N, and Br. Among Ms, at least one selected from the group consisting of P, Si, and B is particularly preferable since being inexpensive.

The polyanion indicates a molecular ion species represented, for example, by the general formula: $[M_yA_z]^{x-}$. A lithium salt of a polyaniline containing an element M and an element A represented by the general formula: $Li_xM_yA_z$ has an A-Li bond (such as O—Li bond) having an ion binding property, and since a lithium ion hops on the A site, the lithium ion conductivity is obtained. In particular, the lithium compound is preferably a polyoxometalate compound in view of the stability. In addition, the range of x is, for example, $0<x\leq0.8$ and is preferably $0.22\leq x\leq0.44$.

As the polyoxometalate compound, one of $Li_3PO_4$, $Li_4SiO_4$, $Li_2Si_2O_5$, $Li_2SiO_3$, $Li_3BO_3$, $Li_3VO_4$, $Li_3NbO_4$, $LiZr_2(PO_4)$, $LiTaO_3$, $Li_4Ti_5O_{12}$, $Li_7La_3Zr_2O_{12}$, $Li_5La_3Ta_2O_{12}$, $Li_{0.35}La_{0.55}TiO_3$, $Li_9SiAlO_8$, and $Li_{1.3}Al_{0.3}Ti_{1.7}(PO_4)_3$ may be used alone, or those compounds may also be used in arbitrary combination. In particular, since the lithium ion conductivity is excellent, at least one selected from the group consisting of $Li_3PO_4$, $Li_4SiO_4$, $Li_2Si_2O_5$, $Li_2SiO_3$, $Li_3BO_3$, $Li_3VO_4$, and $Li_3NbO_4$ may be used. In addition, since having a good compatibility with an alloy-based active material (such as a silicon oxide or a silicon alloy) containing silicon, $Li_4SiO_4$, $Li_2Si_2O_5$, and $Li_2SiO_3$ are also preferably used when the carbon material and the alloy-based active material are used in combination. In particular, $Li_4SiO_4$ is preferable since being unlikely to cause a side reaction which generates gas, stable, and relatively inexpensive. The reason for this is believed that $Li_4SiO_4$ having a high lithium content is not likely to cause a side reaction which incorporates lithium ions. Hence, the polyoxometalate compound preferably contains at least $Li_4SiO_4$.

When the bond between the carbon material particle and the lithium compound is strong, a compound having an M-C bond is formed at the interface between the carbon material particle and the lithium compound. The M-C bond is a bond between an element M derived from the lithium compound and a carbon atom (C) on the surface of the carbon material particle. The presence of the M-C bond can be confirmed by measuring a powder X-ray diffraction spectrum of the secondary particle. For example, in the case of a polyoxysilicate, such as $Li_4SiO_4$, if a Si—C bond is formed, a peak belonging to the Si—C bond is observed at approximately $2\theta=34.3°$ to $34.4°$. This result indicates that the carbon material particles are strongly bonded to each other with the solid electrolyte interposed therebetween to form the secondary particle.

Since the secondary particles are each formed of the primary particles boned to each other, spaces are formed between the primary particles. Since the spaces in the secondary particle promote permeation of the nonaqueous electrolyte, although the carbon material particles are covered with the solid electrolyte, lithium ions can be rapidly transferred to and from the carbon material particles.

On the other hand, in order to increase the capacity of the negative electrode, it is preferable that the porosity in the secondary particle is not excessively high. When the primary particles are strongly bonded to each other so as to form the M-C bonds, the secondary particles are each compacted, and hence the porosity in the secondary particle cannot be excessively increased. In addition, the porosity in the secondary particle (P (%)) can be calculated by P=100×Ssp/(Ssp+Sen) in such a way that after a cross-sectional photo of the secondary particle is measured, and the cross-sectional photo is processed by binarization, a space region Ssp in the secondary particle and another region Sen occupied with the primary particles are then discriminated from each other. In consideration of the consistency with the porosity of a negative electrode mixture layer which will be described below, the porosity P in the secondary particle measured by the method as described above is, for example, 0% to 50% ($0\leq P<50$).

In order to increase the capacity of the negative electrode as described above, the rate of the content of the solid electrolyte to the carbon material particles occupied in the secondary particle is preferably decreased as much as possible. In addition, in order to easily enable lithium ions to transfer to and from the carbon material particle, the carbon material particle is preferably covered with a layer of the solid electrolyte having a small and uniform thickness as much as possible. Accordingly, the amount of the solid electrolyte contained in the secondary particle with respect to 100 parts by mass of the carbon material particles is preferably 1 to 300 parts by mass, more preferably 1 to 100 parts by mass, and further preferably 1 to 20 parts by mass or 1 to 10 parts by mass.

The negative electrode active material is mixed, for example, with a binding agent and is then formed to have a predetermined shape, such as a coating film (negative electrode mixture layer) or pellets. In particular, when a battery having a high capacity and a high output is manufactured, a negative electrode in which a thin negative electrode mixture layer is provided on a surface of a sheet-shaped negative electrode collector is used. In order to increase the filling property of the negative electrode active material in the negative electrode mixture layer as described above, the average particle diameter (D50) of the secondary particles forming the negative electrode active material is preferably sufficiently small as compared to the thickness of the negative electrode mixture layer. The average particle diameter (D50) of the secondary particles is, for example, preferably 5 to 30 μm and more preferably 10 to 25 μm. In addition, the average particle diameter (D50) indicates a median diameter at which the cumulative volume in a volume-basis particle size distribution is 50%. The average particle diameter is measured, for example, using a laser diffraction/scattering type particle size distribution measurement device.

The average particle diameter (D50) of the carbon material particles forming the primary particles is, for example, preferably 0.5 to 25 μm and more preferably 0.5 to 5 μm. Accordingly, secondary particles having an appropriate size as described above can be easily formed. In addition, a stress caused by the change in volume of the carbon material particle due to charge/discharge can be easily dispersed. Furthermore, the surface area of the negative electrode active material which performs a charge/discharge reaction can also be increased. In general, when the average particle diameter of the carbon material particles is decreased, although a side reaction in association with the production of SEIs is likely to proceed, when the surface of the carbon material particle is covered with the solid electrolyte, the influence of the side reaction as described above is significantly suppressed. In addition, the carbon material particle forming the primary particle may be either a single particle or an aggregate of fine particles. The fine particles are, for example, particles each having a particle diameter of 50% or less of that of the carbon material particle forming each primary particle.

Although the number of the primary particles forming the secondary particle is not particularly limited, for example, the number may be 2 to 500,000 and preferably 10 to 1,000 or 50 to 300. The number of the primary particles forming the secondary particle may be calculated in such a way that after 10 secondary particles are arbitrarily selected, the number of primary particles contained in each secondary particle is counted, and the average value of the 10 secondary particles is obtained from the values thus counted.

Although a carbon material forming the carbon material particles is not particularly limited, for example, at least one selected from the group consisting of graphite and hard carbon is preferably used. Of the materials mentioned above, since having a high capacity and a small irreversible capacity, graphite is promising. In addition, since graphite has a high activity to the reduction decomposition of the nonaqueous electrolyte, the effect obtained by covering the surface of graphite with the solid electrolyte is significant.

Graphite is a generic name of carbon materials having a graphite structure and, for example, includes natural graphite, artificial graphite, and graphitized mesophase carbon particles. As the natural graphite, for example, flake graphite and earthy graphite may be mentioned. In general, a carbon material in which the plane distance $d_{002}$ of the 002 plane of the graphite structure calculated from an X-ray diffraction spectrum is 3.35 to 3.44 Å is classified in graphite. On the other hand, the hard carbon is a carbon material in which fine graphite crystals are arranged in random directions, further graphitization is not substantially advanced, and the plane distance $d_{002}$ of the 002 plane is larger than 3.44 Å.

In addition, in the secondary particle, an electrically conductive agent and a noncarbon-based active material may also be contained. As the electrically conductive agent, acetylene black or Ketjen black is preferable. As the noncarbon-based active material, an active material containing silicon or tin is preferable, and for example, a silicon element or a silicon compound is preferable. As the silicon compound, a silicon oxide or a silicon alloy may be mentioned.

Next, a method for manufacturing a negative electrode active material will be described by way of example.

The method for manufacturing a negative electrode active material comprises: a step of preparing carbon material particles, a step of preparing a solid electrolyte, and a step of producing secondary particles from the carbon material particles and the solid electrolyte.

(i) Step of Preparing Carbon Material Particles

As described above, the carbon material particles forming the primary particles preferably have, for example, an average particle diameter of 0.5 to 25 μm. On the other hand, the average particle diameter of carbon materials (hereinafter, referred to as "raw material carbon"), such as commercially available graphite and hard carbon, is generally larger than the average particle diameter suitable for the carbon material particles forming the primary particles. In the case as described above, a raw material carbon having an average particle diameter larger than a desired average particle diameter may be processed so as to prepare carbon material particles having a desired average particle diameter. As a method for processing a raw material carbon, for example, pulverization using a pulverizer may be mentioned. The average particle diameter of the carbon material particles may be controlled by passing the particles through a mesh or a sieve.

(ii) Step of Preparing Solid Electrolyte

In order to cover the surfaces of the carbon material particles with the solid electrolyte, first, a powdered solid electrolyte having a particle diameter smaller than that of the carbon material particle is preferably adhered to the surface thereof. As described above, the solid electrolyte preferably covers the surface of the carbon material particle, for example, by a thickness of 0.1 μm or less. Hence, the solid electrolyte adhered to the surface of the carbon material particle is preferably a powder having an average particle diameter (D50) of 0.1 μm or less. The control of the average particle diameter of the powdered solid electrolyte may be performed by an operation, such as stirring, pulverizing, or sieving, as is the case of the carbon material particles.

(iii) Step of Producing Secondary Particles

First, the powdered solid electrolyte is adhered to the surfaces of the carbon material particles. Although the method therefor is not particularly limited, for example, the carbon material particles and the powdered solid electrolyte are mixed together using a stirring machine. As the solid electrolyte, a lithium compound is preferably used. For example, with respect to 100 parts by mass of carbon material particles (such as graphite) having an average particle diameter 0.5 to 25 μm, 1 to 300 parts by mass of a lithium compound having an average particle diameter of 0.1 μm or less is mixed. In this case, aggregates each containing a plurality of fine particles of the carbon material may be formed in advance, and the solid electrolyte may be adhered to the surfaces of the aggregates. In this case, the average particle diameter of the aggregates is preferably controlled to be 0.5 to 25 μm.

By a gas phase method or a liquid phase method, the powdered solid electrolyte may be adhered to the surfaces of the carbon material particles. By a gas phase method or a liquid phase method, the surfaces of the carbon material particles can be directly covered with the solid electrolyte. As the gas phase method, for example, a physical vapor deposition method (PVD), a chemical vapor deposition method (CVD), or an atomic layer deposition method (ALD) may be mentioned. As the liquid phase method, for example, a precipitation method or a sol-gel method may be mentioned. In this embodiment, the precipitation method is a method in which a deposition of the solid electrolyte is generated in a liquid in which the carbon material particles are dispersed, and the deposition is adhered to the surfaces of the carbon material particles.

Next, in order to increase the adhesion between the carbon material particle and the solid electrolyte, the carbon material particles having surfaces to which the solid electrolyte is adhered (mixture of the carbon material particles and the solid electrolyte) are preferably heated. In this case, when the mixture is heated at a temperature of the melting point of the solid electrolyte or more, or the mixture is heated while the pressure is applied thereto, the adhesion between the carbon material particle and the solid electrolyte can be further increased. In addition, by controlling the heating conditions, the M-C bond between the carbon material particle and the lithium compound can be formed. Hence, the probability of peeling of the solid electrolyte from the carbon material particle is further decreased. In addition, when the mixture is heated at the melting point of the solid electrolyte or more, the bonds between the primary particles are strengthened, so that the strength of the secondary particle is increased.

As a treatment method for applying the pressure, for example, a HIP method (Hot Isostatic Pressing Method) may be mentioned. When the mixture is heated while the pressure is applied thereto, the heating temperature may be decreased as compared to that in the case in which no pressures is applied.

The heating of the mixture is preferably performed using a heating device having a rotary furnace or a fluidized bed while the mixture is stirred. The heating atmosphere is preferably an inert gas atmosphere. As the inert gas, for example, argon, helium, or nitrogen may be used.

When the solid electrolyte is $Li_3PO_4$ (melting point: 873° C.), heating is preferably performed at 900° C. to 1,000° C.; in the case of $Li_4SiO_4$ (melting point: 1,255° C.), heating is preferably performed at 1,200° C. to 1,300° C.; in the case of $Li_2Si_2O_5$ (melting point: 1,033° C.), heating is preferably performed at 1,050° C. to 1,150° C.; and in the case of $Li_2SiO_3$ (melting point: 1,201° C.), heating is preferably performed at 1,250° C. to 1,350° C.

When a product obtained after the heating contains aggregates of the secondary particles, the product may be appropriately pulverized. In this case, the average particle diameter of the secondary particles is controlled, for example, to be 5 to 30 μm. In addition, the aggregate indicates the state in which the secondary particles are collected together by a weak intermolecular force and is different from the bond between the primary particles forming the secondary particle.

Next, one example of the negative electrode will be described. In this case, a sheet-shaped negative electrode forming a winding type electrode group or a laminate type electrode group will be described.

The sheet-shaped negative electrode includes a sheet-shaped negative electrode collector and at least one negative electrode mixture layer provided on a surface of the negative electrode collector. The thickness of the negative electrode mixture layer is, for example, 10 to 100 μm. The negative electrode mixture layer may be formed on one surface of the negative electrode collector or on each of two surfaces thereof.

As the negative electrode collector, for example, metal foil, a metal sheet, a mesh body, a punching sheet, or an expanded metal may be mentioned. As a material of the negative electrode collector, for example, stainless steel, nickel, copper, or a copper alloy may be used. The thickness of the negative electrode collector is selected, for example, from a range of 3 to 50 μm.

The negative electrode mixture layer contains the negative electrode active material (the above secondary particles) and a binding agent. The amount of the binding agent with respect to 100 parts by mass of the negative electrode active material is preferably 0.1 to 20 parts by mass and more preferably 1 to 5 parts by mass.

As the binding agent, for example, there may be mentioned a fluorine resin, such as a poly(vinylidene fluoride) (PVdF), a polytetrafluoroethylene (PTFE), or a tetrafluoroethylene-hexafluoropropylene copolymer (HFP); an acrylic resin, such as a poly(methyl acrylate) or an ethylene-methyl methacrylate copolymer; or a rubber material, such as a styrene-butadiene rubber (SBR) or an acrylic rubber.

When the negative electrode mixture layer is formed, first, the negative electrode active material and the binding agent are mixed together with a dispersant, so that a negative electrode mixture slurry is prepared. The negative electrode mixture slurry may further contain, if necessary, arbitrary components, such as a thickening agent and/or an electrically conductive agent. After the negative electrode mixture slurry is applied on the surface of the negative electrode collector and is then dried, rolling is performed, so that the negative electrode mixture layer is formed.

As the dispersant, for example, water, an alcohol such as ethanol, an ether such as tetrahydrofuran, or N-methyl-2-pyrrolidoen (NMP) may be used. When water is used as the dispersant, a water-soluble high molecular weight material is used as the thickening agent. As the water-soluble high molecular weight material, for example, there may be mentioned a carboxymethyl cellulose or a poly(vinyl pyrrolidone). As the electrically conductive agent, for example, carbon black or carbon fibers may be used.

Next, a nonaqueous electrolyte secondary battery will be described.

When at least one positive electrode having a sheet shape and at least one negative electrode having a sheet shape are alternately laminated to each other with at least one separator interposed therebetween, a laminate type electrode group is obtained. When a positive electrode having a long sheet shape and a negative electrode having a long sheet shape are wound with at least one separator interposed therebetween, a winding type electrode group is obtained. The electrode group is received in a battery case together with a nonaqueous electrolyte.

Hereinafter, by using a square winding type battery as one example, constituent elements other than the negative electrode will be described in detail. However, the type, the shape, and the like of the nonaqueous electrolyte secondary battery are not particularly limited.

Figure 1:
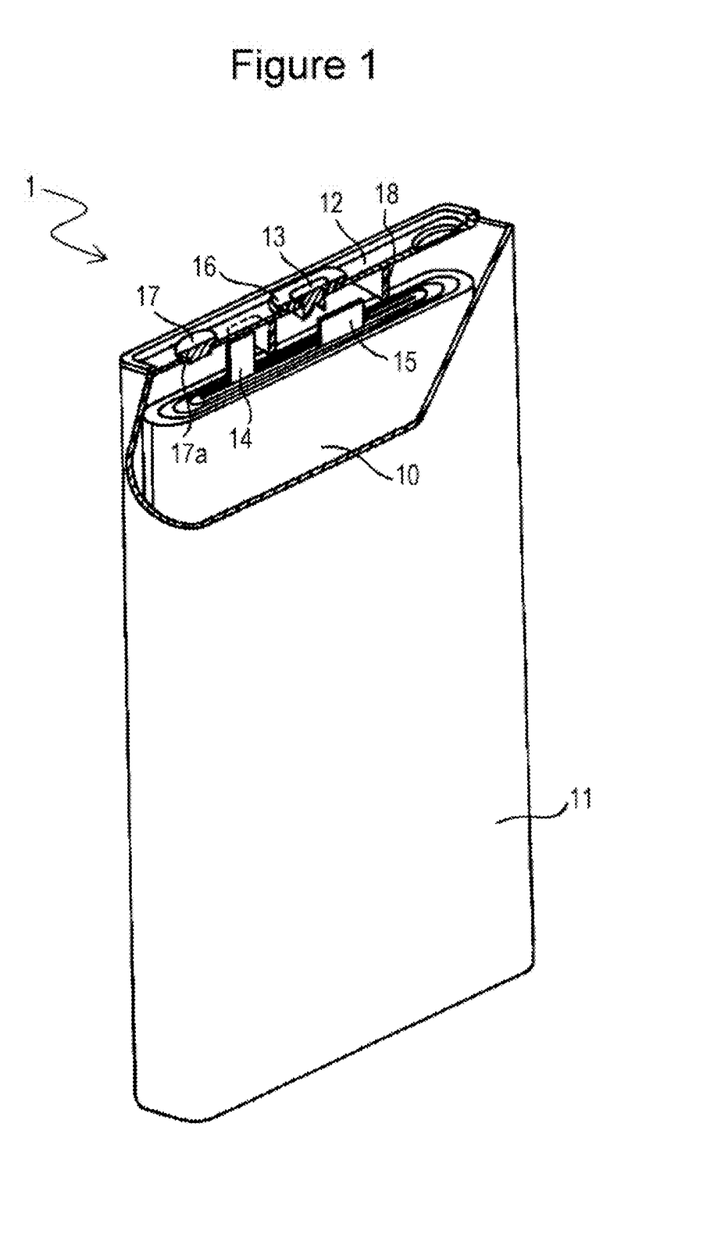
FIG. 1 is a partially cutaway perspective view of a nonaqueous electrolyte secondary battery according to one embodiment of the present invention.

FIG. 1 is a perspective view schematically showing a square type nonaqueous electrolyte secondary battery according to one embodiment of the present invention. In FIG. 1, in order to show the structure of an important portion of a nonaqueous electrolyte secondary battery 1, a partially cutaway structure is shown. In a square battery case 11, a flat winding type electrode group 10 and a nonaqueous electrolyte (not shown) are received.

To a positive electrode collector of a positive electrode included in the electrode group 10, one end portion of a positive electrode lead 14 is connected. The other end portion of the positive electrode lead 14 is connected to a sealing plate 12 functioning as a positive electrode terminal. On the other hand, one end portion of a negative electrode lead 15 is connected to a negative electrode collector, and the other end portion of the negative electrode lead 15 is connected to a negative electrode terminal 13 provided at an approximately center of the sealing plate 12. Between the sealing plate 12 and the negative electrode terminal 13, a gasket 16 is disposed so as to insulate therebetween. Between the sealing plate 12 and the electrode group 10, a frame body 18 formed of an insulating material is disposed, and the negative electrode lead 15 and the sealing plate 12 are insulated from each other. The sealing plate 12 is bonded to an opening end of the square battery case 11 to seal the square battery case 11. In the sealing plate 12, a liquid charge hole 17a is formed, and the nonaqueous electrolyte is charged into the square battery case 11 through the liquid charge hole 17a. Subsequently, the liquid charge hole 17a is sealed by a sealing plug 17.

(Positive Electrode)

The positive electrode has a sheet shape as is the negative electrode. The positive electrode having a sheet shape includes a sheet-shaped positive electrode collector and at least one positive electrode mixture layer provided on a surface of the positive electrode collector. As the positive electrode collector, for example, metal foil or a metal sheet may be mentioned. As a material of the positive electrode collector, for example, stainless steel, aluminum, an aluminum alloy, or titanium may be used. The positive electrode mixture layer may be formed using a positive electrode mixture slurry containing a positive electrode active material, a binding agent, and a dispersant by a method similar to the method for manufacturing a negative electrode mixture layer. If necessary, the positive electrode mixture layer may also contain an arbitrary component such as an electrically conductive agent.

As the positive electrode active material, a lithium composite oxide is preferable. As the transition metal element, for example, there may be mentioned Sc, Y, Mn, Fe, Co, Ni, Cu, or Cr. Among those elements, for example, Mn, Co, or Ni is preferable. As a particular example of the lithium composite oxide, although $LiCoO_2$, $LiNiO_2$, $LiMn_2O_4$, or the like may be mentioned, the oxide is not particularly limited.

(Separator)

As the separator, for example, a resin-made fine porous film, non-woven cloth, or woven-cloth may be used. As the resin, for example, a polyolefin, such as a polyethylene or a polypropylene, a polyamide, or a poly(amide imide) may be used.

(Nonaqueous Electrolyte)

The nonaqueous electrolyte contains a nonaqueous solvent and a solute dissolved in the nonaqueous solvent. As the solute, various lithium salts may be used. The concentration of the lithium salt in the nonaqueous electrolyte is, for example, 0.5 to 1.5 mol/L.

As the nonaqueous solvent, for example, there may be mentioned a cyclic carbonate ester, such as propylene carbonate (PC) or ethylene carbonate (EC); a chain carbonate ester, such as diethyl carbonate (DEC), ethyl methyl carbonate (EMC), or dimethyl carbonate (DMC); or a cyclic carboxylic acid ester, such as γ-butyrolactone or γ-valerolactone. The nonaqueous solvents may be used alone, or at least two types thereof may be used in combination.

As the lithium salt, for example, $LiPF_6$, $LiBF_4$, $LiClO_4$, $LiAsF_6$, $LiCF_3SO_3$, $LiN(SO_2F)_2$, or $LiN(SO_2CF_3)_2$ may be mentioned. The lithium salts may be used alone, or at least two types thereof may be used in combination.

EXAMPLES

Hereinafter, although the present invention will be described in detail with reference to examples and comparative examples, the present invention is not limited to the following examples.

Examples 1 to 5

In accordance with the following procedure, a coin type cell using metal lithium as a counter electrode was formed.

(1) Formation of Negative Electrode

Natural graphite particles (average particle diameter (D50): 20 μm) were pulverized by a jet mill, so that carbon material particles having an average particle diameter of 3.9 μm were prepared.

Subsequently, with respect to 100 parts by mass of the carbon material particles, $Li_4SiO_4$ (average particle diameter: 0.1 μm, melting point: 1,255° C.) in an amount (X mass) shown in Table 1 was added as a solid electrolyte, and stirring was performed until a uniform mixture was obtained.

Figure 2:
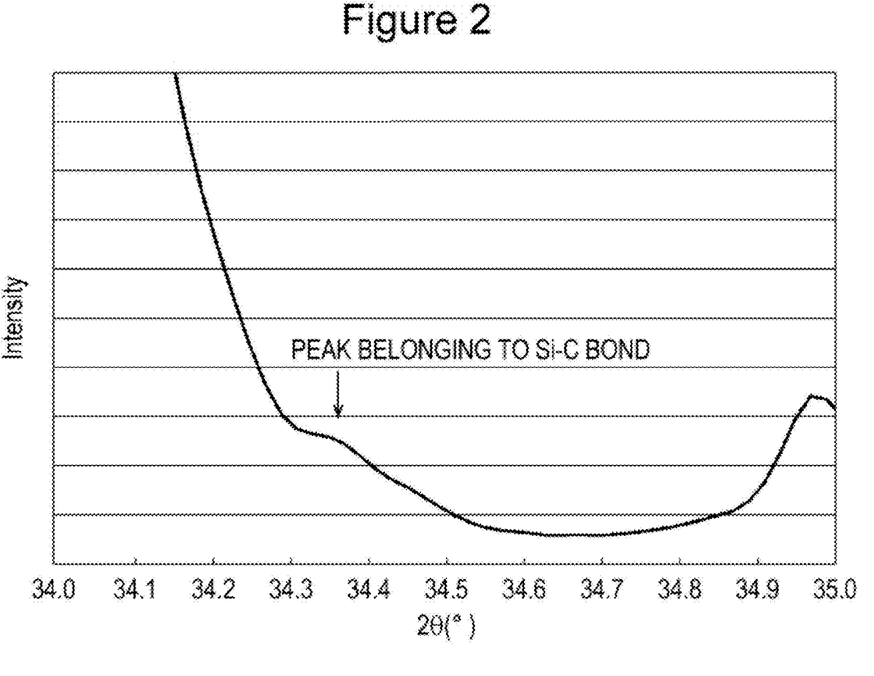
FIG. 2 is a view showing a powder X-ray diffraction spectrum of secondary particles each having a Si—C bond which has a peak belonging to the Si—C bond at $2\theta=34.36°$.

Next, the mixture was heated at 1,300° C. for 1 hour while being continuously stirred in an argon atmosphere, so that production of secondary particles was promoted. Subsequently, the product was appropriately pulverized, so that secondary particles (negative electrode active material) having an average particle diameter of 25 μm were obtained. When powder X-ray diffraction measurement of the secondary particles was performed, a spectrum shown in FIG. 2 was obtained, and a peak derived from a Si—C bond was observed at 2θ=34.36°. When the porosity in the secondary particle was measured, a porosity of 20% was obtained.

Next, 100 parts by mass of the secondary particles (negative electrode active material), 10 parts by mass of a PVdF (binding agent), and an appropriate amount of NMP were mixed together, so that a negative electrode mixture slurry was prepared.

After the negative electrode mixture slurry was applied on one surface of copper foil (negative electrode collector) having a thickness of 10 μm, and a coating film thus obtained was then dried, rolling was performed, so that a negative electrode was formed. The total thickness of the negative electrode mixture layer and the negative electrode collector was 150 μm. The negative electrode was punched out to have a disc shape having a diameter of 9 mm.

(2) Formation of Counter Electrode

Metal lithium foil having a thickness of 300 μm was punched out to have a disc shape having a diameter of 14 mm, and this disc was used as a counter electrode.

(3) Preparation of Nonaqueous Electrolyte

To 100 parts by mass of a mixture liquid containing EC and EMC at a mass ratio of 1:3, 1 part by mass of vinylene carbonate was added, so that a nonaqueous solvent was obtained. $LiPF_6$ was dissolved in the nonaqueous solvent at a concentration of 1.0 mol/L, so that a nonaqueous electrolyte was prepared.

(4) Assembly of Coin Type Cell

A stainless steel-made cell case having an opening and a bottom plate was prepared, and the negative electrode and a separator were disposed in the cell case in this order. As the separator, a non-woven cloth formed of a poly (phenylene sulfide) (PPS) having a thickness of 0.45 mm was used. In addition, a stainless steel-made sealing plate provided with a resin-made gasket containing a polypropylene at a peripheral portion was prepared, and the lithium foil functioning as a counter electrode was adhered to an inner surface of the sealing plate. After the nonaqueous electrolyte was charged in the cell case, the opening of the cell case was sealed by the sealing plate, so that a coin type cell (A1 to A5) was completed. The cell size was set so that the diameter was 20 mm, and the thickness was 3.2 mm.

[Evaluation]

Charge was performed at 0.1 mA to 0 V at 45° C. on the negative electrode of the coin type cell immediately after the assembly, and subsequently, the negative electrode was discharged to 1.5 V. Accordingly, a first charge capacity C1 and a first discharge capacity D1 were obtained. In addition, an initial efficiency (E1) was obtained by E1(%)=100×D1/C1. The results are shown in Table 1.

TABLE 1

| BATTERY | X (PART(S) BY MASS) | Li COMPOUND | INITIAL EFFICIENCY E1 (%) |
|---|---|---|---|
| A1 | 1 | $Li_4SiO_4$ | 90.5 |
| A2 | 10 | $Li_4SiO_4$ | 92.3 |
| A3 | 20 | $Li_4SiO_4$ | 92.9 |
| A4 | 100 | $Li_4SiO_4$ | 89.8 |
| A5 | 300 | $Li_4SiO_4$ | 87.4 |

Examples 6 to 9

Except for that $Li_3PO_4$ (average particle diameter: 0.1 μm, melting point: 873° C.) was used as the solid electrolyte, and the heating temperature for production of the secondary particles was changed to 900° C., batteries A6 to A9 were formed in manners similar to those of Examples 1, 2, 4, and 5, respectively, and the evaluation thereof was performed as was the case described above. The results are shown in Table 2.

TABLE 2

| BATTERY | X (PART(S) BY MASS) | Li COMPOUND | INITIAL EFFICIENCY E1 (%) |
|---|---|---|---|
| A6 | 1 | $Li_3PO_4$ | 90.8 |
| A7 | 10 | $Li_3PO_4$ | 91.6 |
| A8 | 100 | $Li_3PO_4$ | 88.2 |
| A9 | 300 | $Li_3PO_4$ | 85.5 |

Example 10

Except for that $Li_3BO_3$ (average particle diameter: 0.1 μm, melting point: 930° C.) was used as the solid electrolyte, and the heating temperature for production of the secondary particles was changed to 1,000° C., a battery A10 was formed in a manner similar to that of Example 2, and the evaluation thereof was performed as was the case described above. The result is shown in Table 3.

TABLE 3

| BATTERY | X (PARTS BY MASS) | Li COMPOUND | INITIAL EFFICIENCY E1 (%) |
|---|---|---|---|
| A10 | 10 | $Li_3BO_3$ | 92.8 |

Comparative Example 1

Except for that the solid electrolyte was not added to the carbon material particles, and the carbon material particles were only used, a battery B1 was formed in a manner similar to that of Example 1, and the evaluation thereof was performed as was the case described above. The result is shown in Table 4.

TABLE 4

| BATTERY | X (PARTS BY MASS) | Li COMPOUND | INITIAL EFFICIENCY E1 (%) |
|---|---|---|---|
| B1 | 0 | — | 85.0 |

As apparent from Tables 1 to 4, when primary particles containing the carbon material particles and the solid electrolyte covering the surfaces thereof were formed into the secondary particles, the initial efficiency was improved. In addition, when the rate of the solid electrolyte to the carbon material particles was fairly increased, a decrease tendency of the initial efficiency was observed.

Example 11

Except for that a mixing amount of $Li_3PO_4$ (average particle diameter: 0.1 μm, melting point: 873° C.) as the solid electrolyte was set to 20 parts by mass with respect to 100 parts by mass of the carbon material particles, and when the secondary particles (negative electrode active material) were produced, heating was performed by a HIP treatment method, a battery A11 was formed in a manner similar to that of Example 1. As the conditions of the HIP treatment method for the battery A11, the mixture of the carbon material particles and the solid electrolyte was heated at 600° C. for 1 hour at a pressure of 150 MPa.

The initial efficiency of the battery A11 was evaluated in a manner similar to that of the other batteries, and the results are shown in Table 5. The porosity of the secondary particles (negative electrode active material) used for the battery A11 was 3%.

A coulombic efficiency of the battery A11 was obtained. As for the coulombic efficiency, charge/discharge of the battery A11 was performed 10 cycles, and the coulombic efficiency of each of from a fourth to a tenth cycle was obtained, and the average value of the coulombic efficiencies thus obtained was calculated. This average value was regarded as the coulombic efficiency and is shown in Table 5. In addition, the coulombic efficiencies of from the fourth to the tenth cycles were each shown by a percentage of the discharge capacity in one arbitrary cycle when the charge capacity in the corresponding cycle was regarded as 100.

Figure 3A:
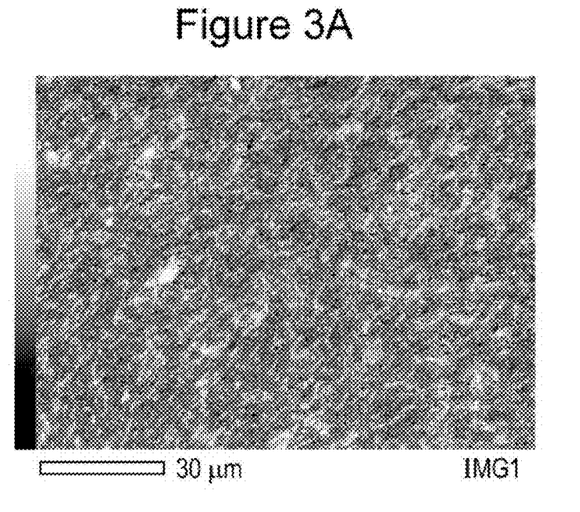
FIG. 3A is a view of a SEM photo showing a cross-section of secondary particles (negative electrode active material).
Figure 3B:
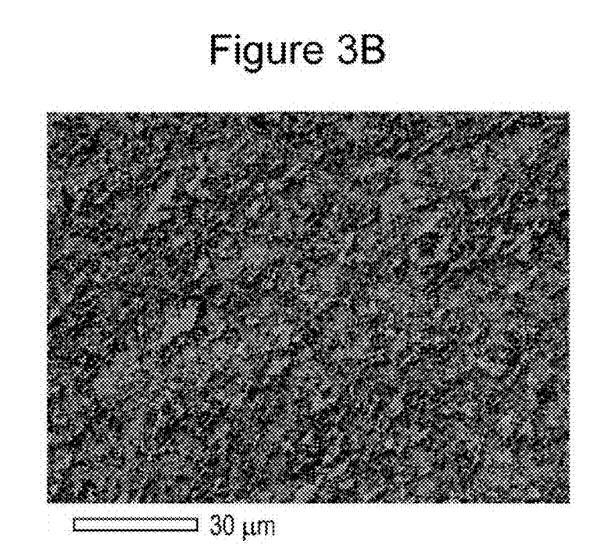
FIG. 3B is a view of a SEM-EDX photo showing a cross-section of the secondary particles (negative electrode active material).
Figure 3C:
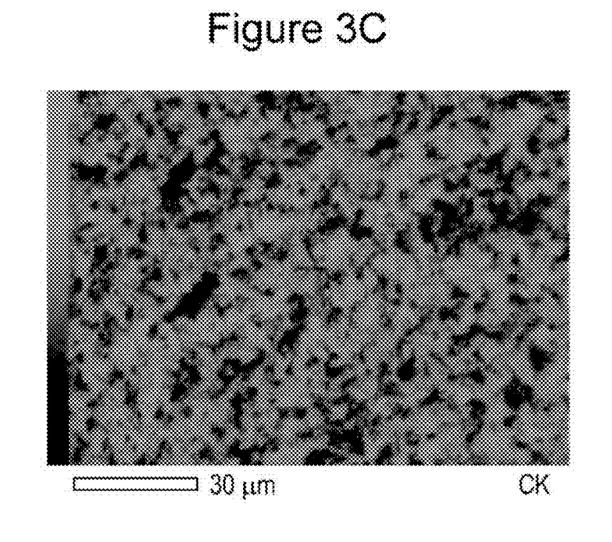
FIG. 3C is a view displaying a component derived from a carbon atom by white in the SEM-EDX photo showing the cross-section of the secondary particles (negative electrode active material).
Figure 3D:
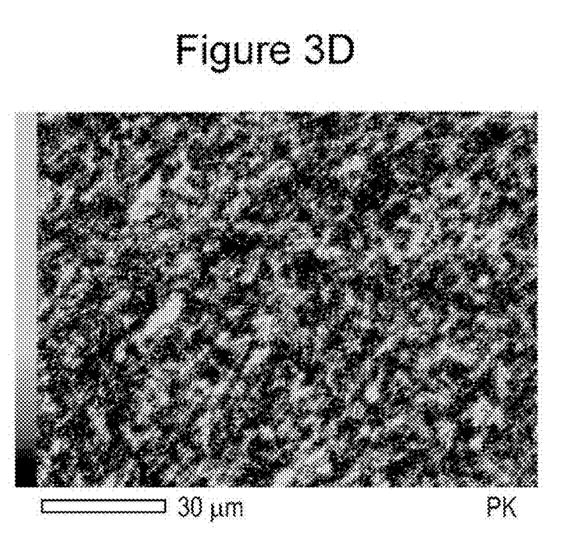
FIG. 3D is a view displaying a component derived from a phosphorus atom by white in the SEM-EDX photo showing the cross-section of the secondary particles (negative electrode active material).
Figure 3E:
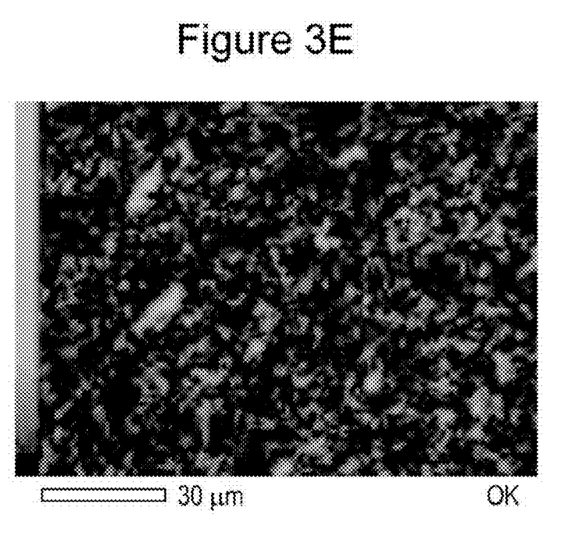
FIG. 3E is a view displaying a component derived from an oxygen atom by white in the SEM-EDX photo showing the cross-section of the secondary particles (negative electrode active material).

A cross-section of the secondary particles (negative electrode active material) of the battery A11 was observed using a SEM and a SEM-EDX, and cross-sectional photos are shown in FIGS. 3A to 3D. FIG. 3A shows a secondary electron image by a SEM. FIG. 3B is a cross-sectional photo by a SEM-EDX. In FIG. 3C, in the cross-sectional photo by a SEM-EDX, a component derived from a carbon atom is shown by white. In FIG. 3D, in the cross-sectional photo by a SEM-EDX, a component derived from a phosphorus atom is shown by white. In FIG. 3E, in the cross-sectional photo by a SEM-EDX, a component derived from an oxygen atom is shown by white. The component derived from a carbon atom is a component derived from the carbon material particle (graphite) of the negative electrode active material, and the components derived from a phosphorus atom and an oxygen atom are components derived from the solid electrolyte of the negative electrode active material.

Comparative Example 2

Except for that the heating treatment was not performed, a battery B2 was formed in a manner similar to that of the battery A11. The initial efficiency and the coulombic efficiency of the battery B2 were also obtained, and the results are shown in Table 5.

The coulombic efficiency of the battery B1 was also obtained, and the results are shown in Table 5.

TABLE 5

| BATTERY | X (PART(S) BY MASS) | Li COMPOUND | TREATMENT | INITIAL EFFICIENCY E1 (%) | COULOMBIC EFFICIENCY (%) |
|---|---|---|---|---|---|
| A11 | 20 | $Li_3PO_4$ | HIP | 85.9 | 99.4 |
| B1 | 0 | — | NONE | 85.0 | 99.3 |
| B2 | 20 | $Li_3PO_4$ | NONE | 84.5 | 99.2 |

As apparent from Table 5, when primary particles containing the carbon material particles and the solid electrolyte covering the surfaces thereof were formed into the secondary particles, since the heating was performed while the pressure is applied, the initial efficiency and the coulombic efficiency were improved.

From the cross-sectional photos of the negative electrode active material shown in FIGS. 3A to 3E, it is found that the solid electrolyte intrudes between the primary particles of graphite, and the secondary particles are formed from the graphite and the solid electrolyte. In the secondary particles, it is found that the solid electrolyte is dispersed without being locally aggregated.

INDUSTRIAL APPLICABILITY

The negative electrode active material according to the present invention is useful as a negative electrode active material of a nonaqueous electrolyte secondary battery to be used for a drive power source of a personal computer, a mobile phone, a mobile device, a personal digital assistant (PDA), a mobile game device, a video camera, or the like; a main power source or an auxiliary power source for an electric motor drive of a hybrid electric vehicle, a fuel cell vehicle, a plug-in HEV, or the like: or a drive power source of an electric power tool, a vacuum cleaner, a robot, or the like.

REFERENCE SIGNS LIST 1 nonaqueous electrolyte secondary battery
10 winding type electrode group
11 square battery case
12 sealing plate
13 negative electrode terminal
14 positive electrode lead
15 negative electrode lead
16 gasket
17 sealing plug
17a liquid charge hole
18 frame body

The invention claimed is:

1. A negative electrode active material for a secondary battery, comprising:
   secondary particles each formed of primary particles bonded to each other,
   wherein the primary particles contain carbon material particles and a lithium ion-conductive solid electrolyte which covers the surfaces of the carbon material particles,
   wherein the solid electrolyte is a lithium compound,
   the lithium compound is a lithium salt of a polyanion including an element M and an element A,
   M is at least one selected from the group consisting of P, Si, B, V, Nb, W, Ti, Zr, Al, Ba, La, and Ta, and A is at least one selected from the group consisting of F, S, O, N, and Br,
   wherein at each of the interfaces between the carbon material particles and the lithium compound, a compound having an M-C bond is formed, and
   wherein the primary particles are bonded to each other by the solid electrolyte interposed therebetween to thereby form the secondary particle.

2. The negative electrode active material for a secondary battery according to claim 1,
   wherein the lithium compound is a polyoxometalate compound.

3. The negative electrode active material for a secondary battery according to claim 2,
   wherein the polyoxometalate compound is at least one selected from the group consisting of $Li_3PO_4$, $Li_4SiO_4$, $Li_2Si_2O_5$, $Li_2SiO_3$, $Li_3BO_3$, $Li_3VO_4$, $LiNbO_3$, and $Li_3NbO_4$.

4. The negative electrode active material for a secondary battery according to claim 3,
   wherein the polyoxometalate compound includes at least $Li_4SiO_4$.

5. The negative electrode active material for a secondary battery according to claim 1,
   wherein the carbon material particles are at least one selected from the group consisting of graphite and hard carbon.

6. The negative electrode active material for a secondary battery according to claim 1,
   wherein the average particle diameter of the carbon material particles is 0.5 to 5 μm.

7. The negative electrode active material for a secondary battery according to claim 1, wherein at least some of the carbon material particles are each an aggregate of fine particles.

8. The negative electrode active material for a secondary battery according to claim 1,
wherein the porosity P satisfies a relationship: $0 \leq P < 50$, the porosity P being calculated by $P=100 \times Ssp/(Ssp+Sen)$,
where a space region in the secondary particle is Ssp and another region occupied with the primary particles is Sen in the cross-sectional photo of the secondary particle processed by binarization.

9. The negative electrode active material for a secondary battery according to claim 1,
wherein the average particle diameter of the secondary particles is 10 to 25 μm.

10. The negative electrode active material for a secondary battery according to claim 1, wherein the amount of the solid electrolyte contained in the secondary particle with respect to 100 parts by mass of the carbon material particles is 1 to 300 parts by mass.

* * * * *